United States Patent [19]

Harvey

[11] Patent Number: 4,509,685
[45] Date of Patent: Apr. 9, 1985

[54] IRRIGATION APPARATUS

[76] Inventor: Vernon B. W. Harvey, Tanglewood, Stour Close, Little Canford, Wimborne, Dorset, England, BH21 7LU

[21] Appl. No.: 405,535

[22] Filed: Aug. 5, 1982

[30] Foreign Application Priority Data

Aug. 7, 1981 [GB] United Kingdom ............... 8124204

[51] Int. Cl.³ .............................................. B05B 3/18
[52] U.S. Cl. .................................. 239/186; 239/199; 239/711; 239/DIG. 1
[58] Field of Search ............... 239/178, 183, 184, 186, 239/188, 187, 189, 199, 177, 709, 710, 711, 721, DIG. 1

[56] References Cited

U.S. PATENT DOCUMENTS

| | | | |
|---|---|---|---|
| 2,474,071 | 6/1949 | Stetson | 239/183 |
| 3,246,848 | 4/1966 | Bowers | 239/178 |
| 3,539,107 | 11/1970 | Mitchell | 239/178 |
| 3,662,776 | 5/1972 | Bryant | 239/710 |
| 3,902,668 | 9/1975 | Daugherty et al. | 239/184 |
| 3,942,722 | 3/1976 | Ede | 239/183 |
| 4,119,272 | 10/1978 | Tidwell | 239/178 |
| 4,260,109 | 4/1981 | Courtright | 239/189 |

FOREIGN PATENT DOCUMENTS 2461448 3/1981 France .......................... 239/DIG. 1

Primary Examiner—Jeffrey V. Nase
Assistant Examiner—Michael J. Forman
Attorney, Agent, or Firm—Gifford, VanOphem, Sheridan, Sprinkle & Nabozny

[57] ABSTRACT

Irrigation apparatus comprising a vehicle to be moved between a pair of fixed positions spaced apart on the ground to be irrigated; a hose drum mounted for rotation on the vehicle; a hose wound on the drum and having an inlet end attachable to a fixed hydrant positioned between the two fixed positions and an outlet end connected to a water-discharging device mounted on or movable with the vehicle, the hose being unwound from the drum when the vehicle is moving away from the hydrant and rewound on the drum when the vehicle is moving towards the hydrant; a taut cable extending between the fixed positions and defining a straight path along which the vehicle is to move between the fixed positions and steering means mounted on the vehicle and responsive to deviation of the vehicle to either side of the cable and operable to restore the vehicle to said straight path defined by the cable.

6 Claims, 21 Drawing Figures

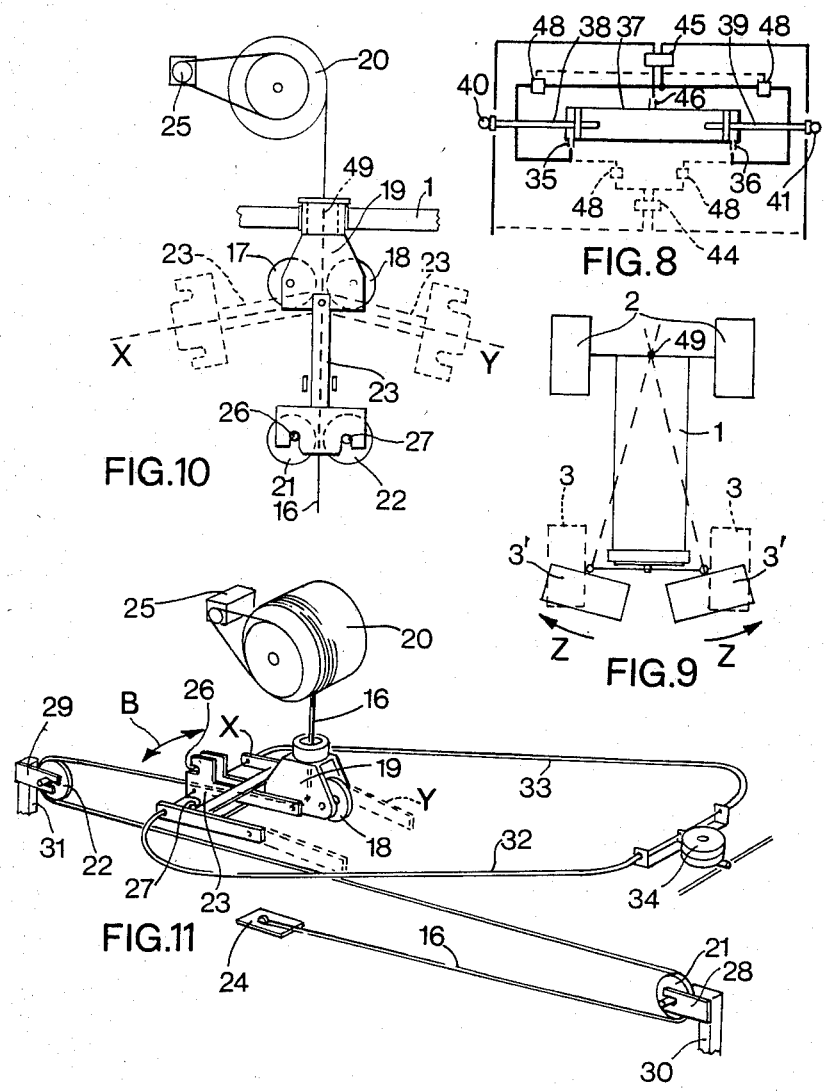

IRRIGATION APPARATUS

FIELD OF THE INVENTION

The invention is concerned with irrigation apparatus for agricultural or horticultural purposes and particularly with an automatic or mainly automatic irrigation machine of the kind having a travelling hose-drum supplying a moving water discharging device with water through the hose from a hydrant or other fixed source of water.

DESCRIPTION OF THE PRIOR ART

A particular object of the invention is to provide an irrigation machine of the travelling hose-drum kind which is reversibly movable between two fixed positions spaced apart one on each side of the hydrant or other fixed water supply position without the machine having to drag the hose over the ground as that has the disadvantage that the hose has to be protected from damage caused by friction with the ground or engaging stones, rocks or other obstructions and therefore would have to be of heavy construction and expensive. An irrigation machine in which a hose is dragged over the ground would also cause damage to growing crops. Another object of the invention is to provide an irrigation machine of the travelling hose-drum kind which is reversibly movable between two fixed positions spaced apart one at each side of the hydrant or other fixed water supply position without the need to provide a predetermined track, furrow or other guidance path.

SUMMARY OF THE INVENTION

According to the invention irrigation apparatus comprises a vehicle movable between two or more predetermined fixed positions spaced apart in an area of ground to be irrigated; a hose drum mounted for rotation on the vehicle and having a hose wound thereon, the hose having an inlet end attachable to a fixed hydrant or arranged to be fixed to receive water from another source and an outlet end connected to a water-discharging device mounted on or movable with the vehicle when the latter is moving between the or each pair of spaced fixed positions; means whereby the hose is unwound from the drum when the vehicle is moving away from the fixed inlet end of the hose; means to rewind the hose on the drum when the vehicle is moving towards the fixed inlet end of the hose; means for propelling the vehicle between the or each pair of spaced fixed positions; guiding means for maintaining the vehicle in a substantially straight path during its travel between the or each pair of fixed positions, the guiding means including a taut cable extending between the or each pair of fixed positions and defining said straight path, and steering means mounted on the vehicle and responsive to deviation of the vehicle to either side of the cable and operable to restore the vehicle to said straight path defined by the cable.

Preferably the cable is wound adjacent one end thereof around a winch mounted on the vehicle and arranged to be driven in the winding-in sense of the cable to maintain the cable taut, the cable also being arranged to be passed around a pulley or a plurality of pulleys in series and connectable at its end remote from the winch to an anchorage at one of said fixed positions, the or each pulley being attachable to an anchorage at the other or another of said fixed positions, whereby the vehicle will be guided by the cable towards one of said fixed positions or to a plurality of said fixed positions in sequence, the fixed position or positions to which the vehicle is guided being determined by the pulley or pulleys being attached to their respective anchorages.

Although the irrigation apparatus provided by this invention is particularly concerned with a vehicle which is reversibly movable in a straight line between two predetermined spaced fixed positions, one at each side of a hydrant or other fixed water supply position, the vehicle could be reversibly movable between the hydrant or other fixed water supply position and only one other predetermined fixed position or it could be movable between any of two or more spaced fixed positions arranged in any predetermined arrangement with respect to a hydrant or other fixed water supply position. For example three fixed positions spaced apart in a triangular arrangement, as viewed in plan.

The apparatus conveniently includes means whereby the or each pulley is automatically releasable from its anchorage, after being engaged therewith, by engagement of the pulley with the vehicle, when the latter has reached the respective anchorage.

The water-discharging device may comprise a water sprinkler or gun mounted directly on the vehicle. Alternatively or additionally the vehicle may carry or have attached thereto a boom extending transversely to the fore-and-aft axis of the vehicle and carrying at least one water sprinkler or gun supplied by the hose. The boom may be swivellable with respect to the fore-and-aft axis of the vehicle about an upright axis in a circular or part-circular arc, for example when the vehicle has reached one of said fixed positions spaced from a starting position of the vehicle adjacent the fixed inlet end of the hose.

The vehicle is preferably propelled by driving at least one pair of the wheels thereof. For example, each wheel of the vehicle may have an individual hub motor. Alternatively or additionally the vehicle may be propelled by operating the aforesaid winch to wind in the cable, the tension of the latter thereby pulling the vehicle towards an appropriate one of said fixed anchorages.

BRIEF DESCRIPTION OF THE DRAWINGS

By way of example, one construction of the irrigation apparatus in accordance with the invention is now described with reference to the accompanying drawings, in which:

FIG. 8 is a hydraulic circuit diagram illustrating part of the steering mechanism shown in FIG. 5 in a manoeuvring mode of the vehicle;

FIG. 9 is a diagram similar to FIG. 7 illustrating the manoeuvring mode according to FIG. 8;

FIG. 10 is a diagram illustrating part of the guidance mechanism shown in FIG. 5 viewed from the side of the vehicle;

FIG. 11 is a perspective diagram illustrating the guidance mechanism shown in FIG. 10 and including the guiding cable and anchor pulleys therefor set out for an operating sequence of the vehicle;

DESCRIPTION OF THE PREFERRED EMBODIMENT

Figure 1:
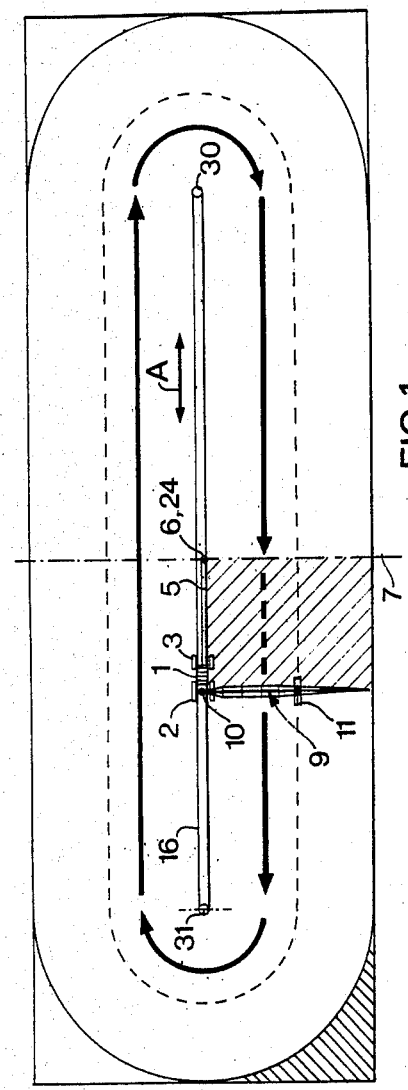
FIG. 1 is a plan view showing a typical locus of the apparatus including the aforesaid vehicle and boom during a complete irrigation cycle and showing the irrigation pattern and sequence.
Figure 2:
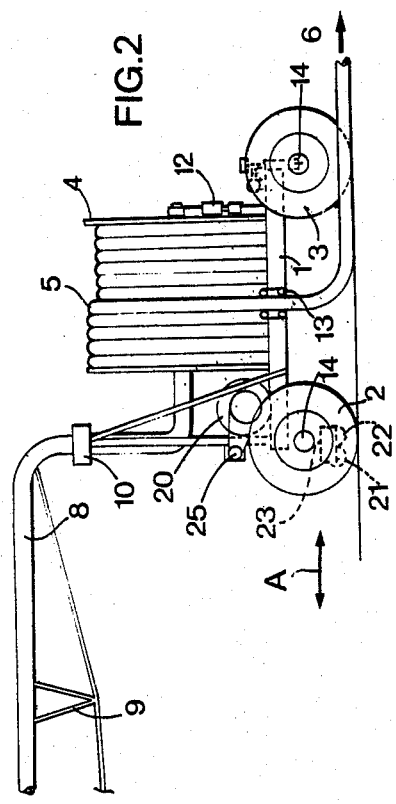
FIG. 2 is a side elevation of the vehicle and part of the boom shown in FIG. 1 to a larger scale.
Figure 3:
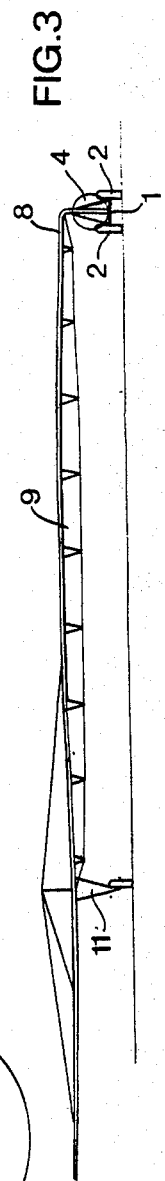
FIG. 3 is an end elevation of the vehicle and the boom to a smaller scale than that of FIG. 2.

Referring to FIGS. 1 to 3, the apparatus comprises a vehicle 1 mounted on two pairs of ground-engaging wheels 2 and 3 of which the wheels 3 are steerable. Instead the vehicle could be mounted on an endless track-laying device. The vehicle 1 is movable, in use, in the direction of arrows A in FIGS. 1 and 2. The vehicle 1 carries a hose drum 4 rotatable about a horizontal axis extending in the fore-and-aft direction of the vehicle, i.e., in the direction of arrows A. A hose 5 is wound on the drum 4 and has an inlet end which is fixed to a hydrant 6 (see FIG. 1). The hydrant may be one of several spaced apart in a pre-laid water main 7 laid across a field to be irrigated. Alternatively an open water channel may be used in conjunction with a pump, the inlet end of the hose 5 being suitably anchored at a fixed point 6. The outlet end of the hose 5 is either connected to a water gun mounted on the vehicle 1 or, as shown, is connected to a pipe 8 extending along a boom 9 which is pivoted about an upright axis at 10 to the vehicle and is supported by a wheeled undercarriage or tower at 11. The boom 9 may carry one or more water sprinklers or guns supplied by the pipe 8 and may carry an end water sprinkler or gun at or adjacent its outer end. The boom may comprise a plurality of boom sections each supported by a wheeled undercarriage or tower 11 and in substantial longitudinal alignment one with another. In use, the boom 9 normally extends transversely to the fore-and-aft directions of the vehicle 1, as indicated in FIGS. 1 and 3; but it is swivellable into longitudinal alignment with the vehicle 1 for towing between fields, as indicated in FIG. 2, and is also arranged to be swung in a circular arc about the axis 10 at the ends of its travel during irrigation, as will be explained hereinafter. Instead of the single swivellable boom, the vehicle may carry a second boom extending laterally from the other side thereof or it may carry a single boom transversely from one side to the other of the vehicle.

The hose drum 4 is driven in both rotational directions by a hydraulic, electric or other motor 12 which may be controlled by electrical solenoids (not shown) operable to stop, start and reverse the motor 12. Thus as the vehicle 1 is moved, as will be explained hereinafter, in a direction away from the fixed hydrant 6, the hose 5 will be unwound from the hose drum 4, and as the vehicle 1 is moved towards the fixed hydrant, the hose 5 will be re-wound on the hose drum 4. The motor 12 also drives a hose feed device 13 operable in known manner on re-winding to arrange the convolutions of hose axially adjacent each other and in a required number of layers on the drum.

Figure 4:
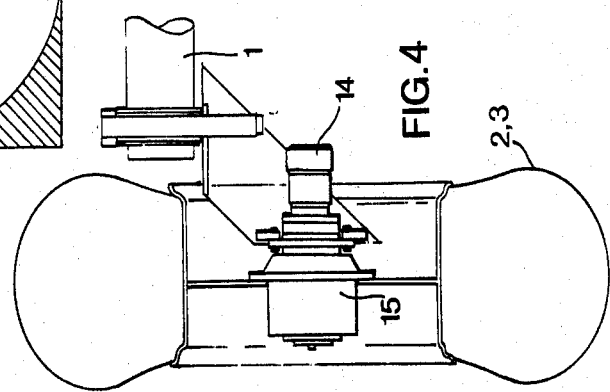
FIG. 4 is an end view of a ground-engaging wheel shown in FIG. 2 drawn to a larger scale.

The propulsion of the vehicle 1 is performed by individual hub motors 14 and gear box 15 (see FIG. 4) mounted on each wheel 2, 3. The hub motors 14 may be driven in unison or individually (as later described) to manoeuvre the vehicle between irrigating positions. The hub motors 14 may be electrical or hydraulic or other motors and may be controlled by electrical solenoids (not shown).

The vehicle is guided in its required path during irrigation by a cable 16 which passes between a pair of pulleys 17, 18 mounted on a block 19 carried on the vehicle 1 and pivotable about a vertical axis (see particularly FIGS. 10 to 21). The cable 16 is wound around a winch 20 mounted on the vehicle 1 and passes between the pulleys 17, 18 and then around a pair of anchor pulleys 21, 22, in series, carried on a steering arm 23 pivotably mounted on the block 19 about a horizontal axis and is finally connected to a fixed anchorage 24 located adjacent the hydrant 6. The winch 20 is driven in the re-winding sense with respect to the cable 16 by an electric, hydraulic or other motor 25, which is also controllable by an electrical solenoid (not shown). The purpose of the motor 25 is to wind-in the cable 16 as necessary in order to keep the cable 16 taut at all times. The winch may have a cable laying device (not shown) operable on re-winding to arrange the convolutions of the cable closely adjacent in one or more layers.

The anchor pulleys 21, 22 are located by their axles in slots 26, 27 respectively in the arm 23 but are removable therefrom and, before use, are located in anchor plates 28, 29 pivotally mounted on anchorages 30, 31 respectively, which are provided on the ground, one at each side of the anchorage 24 and define between them the end of the locus of the vehicle 1. The anchorages 24, 30, 31 are shown in FIG. 1 in a straight line, but they need not be. Similar anchorages in lateral alignment with anchorages 30 and 31 may be provided in pairs one at each side of the water main 7 to provide further parallel loci of the vehicle 1 where several irrigation cycles are to be performed at adjacent positions where a very large area of ground is to be irrigated.

Figure 14:
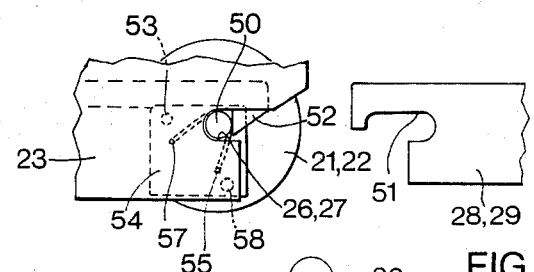
Figure 15:
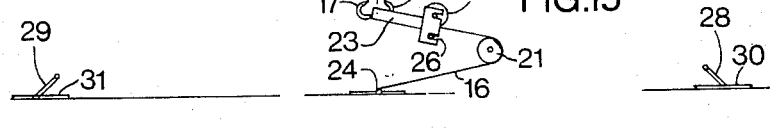
FIGS. 15 to 18 are a series of diagrams showing a sequence for setting out the guiding cable and anchor pulleys prior to commencement of an irrigation cycle.
Figure 16:
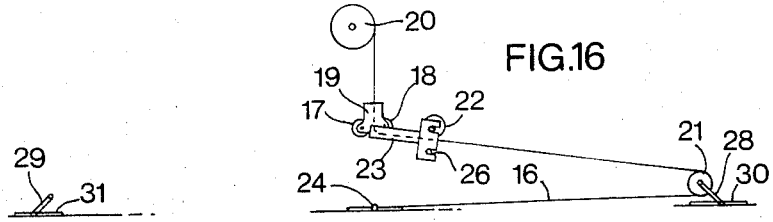
Figure 17:
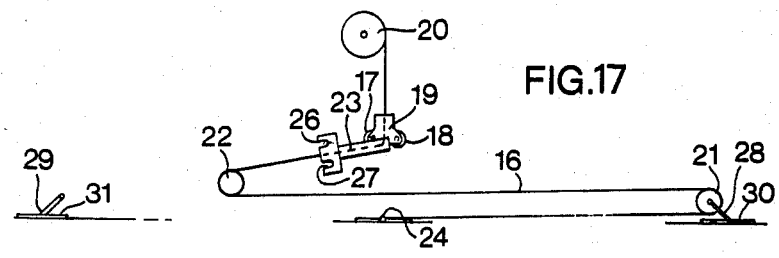
Figure 18:
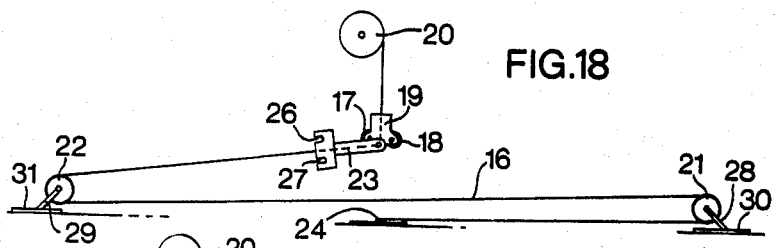
Figure 19:
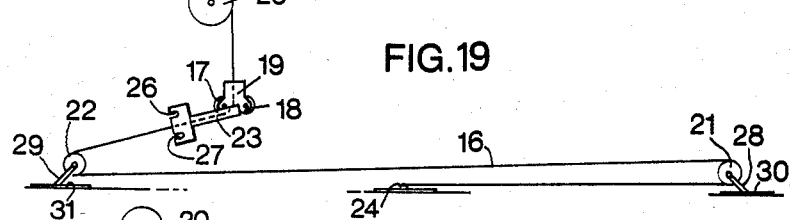
FIGS. 19 to 21 are a series of diagrams showing the sequence of operational phases on winding-in the guiding cable during the irrigation cycle starting from the position of the pulleys shown in FIG. 18.

Prior to an irrigation cycle, the vehicle 1 will be positioned adjacent the anchorage 24 and the hydrant 6. The inlet end of the hose 5 is connected to the hydrant 6 and the outer end of the cable 16 is connected to the anchorage 24. Then the pulley 21 is withdrawn from its slot 26 in the arm 23. This action also pulls out the cable 16 in a loop, as shown in FIG. 15. The pulley 21 is then attached to the anchor plate 28, as indicated in FIG. 16. The arm 23 is then swung in the opposite direction and the pulley 22 is withdrawn from its slot 27. This pulls the cable 16 in a loop, as indicated in FIG. 17. Then the pulley 22 is attached to the anchor plate 29, as indicated in FIG. 18. When the flow of water to the sprinklers or gun commences, the drum 4, the winch 20 and the hub motors 14 are driven to keep the cable 16 taut, un-wind or re-wind the hose 5 and move the vehicle 1 in the required direction. The first part of the movement of the vehicle 1 is to move the vehicle 1, and with it the boom 9, to the left, as viewed in FIG. 1, and as indicated in FIG. 19. The hose 5 is un-wound from the hose drum 4 during this movement, which continues until the vehicle 1 reaches the anchorage 31. At this point in the irrigation cycle, the vehicle 1 will be kept stationary while the boom 9 undergoes an arcuate movement. However for ease of explanation, a description of this movement will be omitted now and described later. When the arm 23 reaches the anchorage 31, the pulley 22 is automatically released from the anchor plate 29 and reengaged with the slot 27 of the arm 23, by a mechanical release mechanism as hereinafter described with reference to FIGS. 12 to 14 or by means of electrical contacts and relays. On recommencement of drive to the winch 20, the cable 16 is wound in and the vehicle 1, together with the boom 9, is moved by operation of the hub motors 14 to the right, past the hydrant 6 and anchorage 24 to the anchorage 30. During the first part of this movement, the hose drum 4 will be driven to re-wind the hose 5 and during the second part of the movement, the hose drum 4 will be driven to unwind the hose 5 from the hose drum. This movement to the right is indicated in FIG. 1 and also in FIG. 20. When the vehicle 1 reaches the anchorage 30, the engagement by the arm 23 with the pulley 21 will automatically release the pulley 21 and re-engage it in the slot 27, in a way similar to that described for pulley 22. The boom is driven through an arc about the axis 10, as will be described hereinafter. After completion of this arcuate movement, the winch motor 25, the hose drum motor 12 and the hub motors 14 are driven and so the cable 16 is again wound-in to maintain it taut, the vehicle 1 is driven to the anchorage 24 and the hose 5 is re-wound on the hose drum 4 as the vehicle is moved towards the anchorage 24. This movement is indicated in FIG. 1 and in FIG. 21. The supply of water from the hydrant 6 is automatically shut off at this point. This completes the irrigation cycle which can then be repeated or the apparatus can be moved to another hydrant and set of anchorages.

The speed of linear movement of the vehicle 1 is determined by the speed of the hub motors 14 which can be controlled in response to servo signals from a tachometer or similar device on the undercarriage 11 to ensure that the boom 9 remains in correct lateral movement with the vehicle 1.

Figure 5:
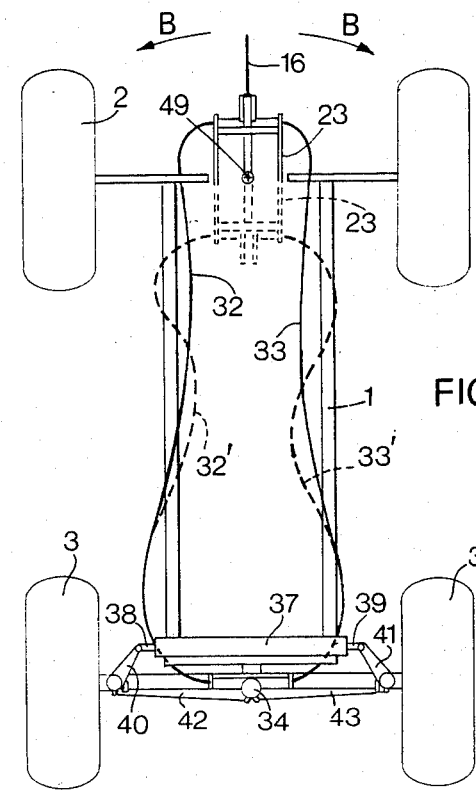
FIG. 5 is a diagram showing the vehicle in plan and the steering mechanism and part of the guidance mechanism thereof.
Figure 6:
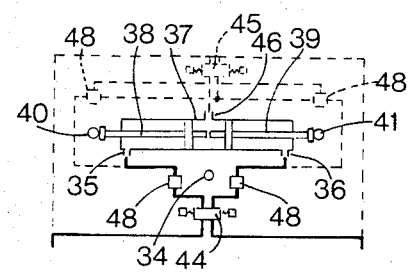
FIG. 6 is a hydraulic circuit diagram illustrating part of the steering mechanism shown in FIG. 5 in a steering mode of the vehicle.
Figure 7:
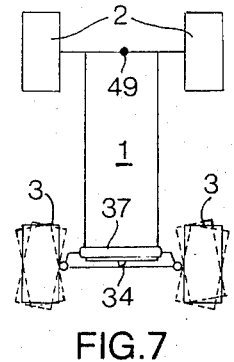
FIG. 7 is a diagram showing the vehicle in plan and illustrating the steering mode according to FIG. 6.
Figure 20:
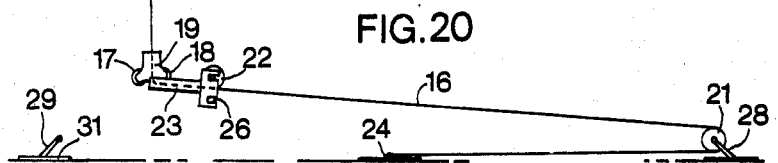
Figure 21:
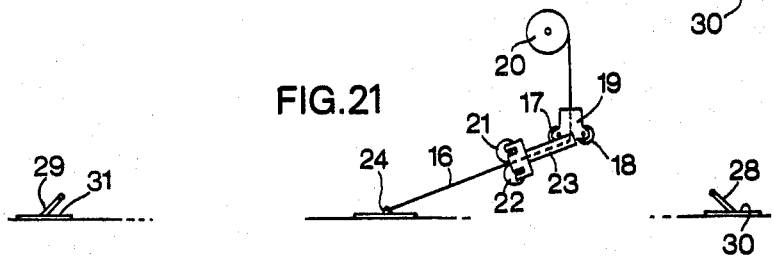

As aforesaid, the purpose of the taut cable 16 which is set out in the field before irrigation in accordance with FIGS. 15 to 18 and is then wound in during irrigation in accordance with FIGS. 19 to 21 is to guide the vehicle 1 and boom 9 during irrigation. The guidance provided by the cable 16 is transmitted to the steerable wheels 3 of the vehicle by a steering mechanism which is now described with reference to FIGS. 5 to 11. The steering arm together with the pulley block 19 on which it is pivotally mounted is rotatable about a vertical axis 49 co-axial with the upright part of the cable 16, as is best seen from FIGS. 10 and 11. The steering arm 23 hangs freely downwardly as shown in FIG. 10 until the cable 16 has been set out in accordance with FIGS. 15 to 18 and when the cable 16 has been set out, the steering arm 23 is supported by the cable in either operating position X or Y as shown in broken lines in FIG. 10 depending on which side of the central anchorage 24 the vehicle is positioned. In FIGS. 5 and 11 the operating position X of the steering arm 23 is shown in full lines and the operating position Y is shown in broken lines. The steering arm 23 can pivot from side to side in the directions of arrows B as indicated in FIGS. 5 and 11 in both operating positions X and Y, the amount of pivoting depending upon the sideways deviation of the vehicle from the path determined by the relevant part of the cable 16. The leading end of each side of the steering arm 23, referring to the latter in its operating position X, that is the trailing end referring to the steering arm 23 in operating position Y, is connected by a flexible cable 32, 33 of the Bowden or other sleeved type to a rotatable sensor 34. The sensor 34 is turned either clockwise or anti-clockwise by the direction in which it is pulled by one or other of the cables 32, 33 according to the pivotal movement to the left or the right by the steering arm 23. The sensor 34 controls the flow of pressurised fluid through a solenoid-operable valve 44 to one or other end port 35, 36 of a double-acting ram 37 having opposed pistons 38, 39 which are moved to turn the wheels 3 (as indicated by broken lines in FIG. 7) by means of arms 40, 41 in directions to correct the deviation of the vehicle to the left or right-hand side of the cable 16. The sensor 34 is returned to its central position by links 42, 43 connected to the arms 40, 41 to correct the deviation. FIG. 6 indicates a fluid control circuit in which the fluid connections to and from the ports 35, 36 are shown in full lines. The fluid control circuit also includes another solenoid valve 45 which controls a part of the circuit including connections to a central port 46 in the cylinder of the ram 37. This part of the circuit is not in operation during the steering mode illustrated in FIG. 7 when the port 46 is closed by the solenoid valve 45. Non-return valve 48 are provided in the fluid control circuit but these are not further described.

It is convenient at this point to refer to FIGS. 8 and 9 which relate to a manoeuvring mode of the vehicle which can be employed when the vehicle is to be turned when it is to be moved from one irrigating location to another. The manoeuvring mode is selected by operating solenoid valve 45 to open port 46 to the control fluid supply and to connect the ports 35 and 36 as exhaust ports, the part of the fluid control circuit then being operative is shown in FIG. 8 in full lines, the part which is not then operative being shown in broken lines. By applying the control fluid through port 46, the pistons 38, 39 are both extended from the cylinder of the ram 37 as shown in FIG. 8 and thus the wheels 3 are pivoted from their fore-and-aft positions as shown in broken lines to the positions shown in full lines at 3' in FIG. 9 in which their axes of rotation intersect at the vertical pivotal axis of the pulley block 19 at 49. The vehicle can then be turned about the axis 49 in either direction as indicated by arrows Z by driving both wheels 3 in the same direction and by simultaneously driving one wheel 2 forward and the other wheel 2 in reverse by appropriate operation of the wheel motors 14.

Figure 12:
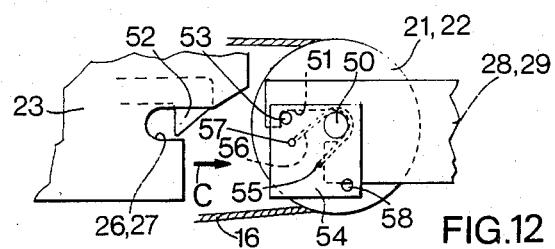
FIGS. 12 to 14 are diagrams showing constructional details and operative sequences of the steering arm, guiding cable, an anchor pulley and an anchor plate for locating the anchor pulley.
Figure 13:
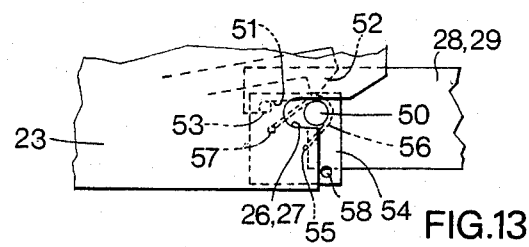

The release of the anchor pulleys 21, 22 from their respective slots in the steering arm 23 and their engagement with the plates 28, 29 of the respective anchorages 30, 31 and conversely the release of the anchor pulleys 21, 22 from the respective arms 28, 29 and their engagement in the respective slots in the steering arm 23 are now described with reference to FIGS. 12 to 14. Each pulley 21, 22 has an axle 50 extending from it and locatable either in the slot 26, 27 of the steering arm 23 or in a recess 51 in anchorage plates 28, 29. The axle 50 is retained in the slot 26, 27 of the steering arm 23 by a latch lever 52 pivoted to the steering arm 23 and is pivotable from a closed position as indicated in FIGS. 12 and 14 to an open position as indicated in FIG. 13 against the force of a return spring (not shown). In setting out the cable into the positions shown in FIGS. 15 to 18, the pulley 21, 22 is removed from the slot 26, 27 in the steering arm 23 by first opening the latch lever 52. The axle 50 is held in the slot 51 in the anchor plate 28, 29 by a locking pin 53 carried on a locking plate 54 mounted on the pulley 21, 22 being located in one end of the slot 51 and held by one end 55 of a hair-pin type of spring 56 carried on the locking plate 54 bearing against the anchor plate 28, 29, as shown in FIG. 12. The other end 57 of the spring 56 is fixed to the locking plate 54. The locking plate 54 also carries a disengaging pin 58.

Assuming that the pulley 21, 22 is held in an anchor plate 28, 29, as shown in FIG. 12, the automatic release and recovery of the pulley by the steering arm 23 will now be described with reference to FIGS. 12 to 14. The steering arm 23 held in the position shown in FIG. 12 by the cable 16 approaches the anchor plate 28, 29 in the direction of arrow C. As shown in FIG. 13, the slot 26, 27 in the steering arm 23 moves into registration with the axle 50 of the pulley and the latch lever 52 rides over the axle. Continued movement of the steering arm 23 towards the anchor plate 28, 29 causes the leading end of the steering arm 23 to strike the disengaging pin 58. The locking plate 54 is rotated by the steering arm 23 pushing the disengaging pin 58 in an anticlockwise direction as viewed in FIG. 13. This rotational movement disengages the locking pin 53 from the slot 51 and the steering arm 23 moves further to the right thereby permitting the axle 50 to enter fully into the slot 26, 27 and to leave the slot 51 under the tension of the cable 16. The latch lever 52 then closes to trap the axle 50 in the slot 26, 27. Then the vehicle 1 changes direction and moves away from the anchor lever 28, 29 to the left as viewed in FIG. 14.

The arcuate movement of the boom 9 which is performed when the vehicle 1 reaches the anchorages 30 and 31 and the linear movement of the vehicle 1 has been stopped by stopping the hub motors 14 on the wheels will now be described. This arcuate movement is effected by the drive unit on the or each undercarriage or tower 11 after the winch motor 25 and the hose drum motor 12 have been stopped. The drive unit on the or each undercarriage or tower 11 may be a hydraulic or electric motor or an internal combustion or other engine or motor. The boom 9 therefore swings in a semi-circular arc at a controlled speed and sprinklers or a gun on the boom irrigate a semi-circular area, as indicated in FIG. 1. Thus during the complete irrigation cycle a rectangular area plus two semi-circular end areas of ground will have been irrigated. Where more than one boom is employed, the booms are maintained in alignment by detecting the misalignment, for example, by a tachometer and controlling the speed of the motor of the leading or trailing boom to restore the correct alignment. As an added refinement, irrigation of the corners, indicated at one corner in FIG. 1 by hatching, of a rectangular area can be effected by bringing into operation a sprinkler or gun mounted at or adjacent the end of the boom 9.

The motors employed to drive the wheels of the vehicle 1, the wheels of the or each undercarriage or tower, the hose drum 4 and the winch 20 are conveniently hydraulic motors powered from a power unit mounted on the vehicle 1 and driven by a diesel engine and they are preferably all controllable individually by solenoids from a control panel, which may be pre-programmed. Thus when the cable has been set out in accordance with FIGS. 15 to 18 the irrigation program can be performed automatically.

The irrigation pattern shown in FIG. 1 is only given by way of example. Variations of it are possible. For example, the irrigation at the ends of the rectangular area can be omitted by not providing the semi-circular orbital passes. Another variation would be to irrigate only on one side of the supply pipe 7, i.e. by performing the movement of the vehicle only to the left or to the right of the supply pipe 7 as viewed in FIG. 1. Another variation would be to irrigate only during travel of the vehicle 1 in one direction, i.e., to the left or to the right as viewed in FIG. 1 resulting in irrigation only on one side of the horizontal centre line of the whole area illustrated in FIG. 1. These variations may be performed with or without one or both semi-circular orbital passes or part thereof. Yet another variation would be to drive the boom 9 around in a completely circular irrigation path.

Although the purpose of the cable 16 is to provide guidance, the cable could also be used to pull the vehicle towards an anchorage by winding in the cable on the winch 20 thereby to aid or to effect propulsion. In either case the cable 16 must be kept in tension in order to give guidance and so a safety device may be provided to shut down all motors and pumps if the tension in the cable should fall below a predetermined value. The cable 16 may also be used to guide the vehicle 1 from one irrigation location to another by unhitching the outer end of the cable from the anchorage 24 at the first location and anchoring it at the corresponding anchorage 24 at the second location. The second location could not be at a greater distance then the length of the cable from the first location; but this is not a practical disadvantage because the length of the cable 16 is four times the length of the hose as will be appreciated from FIGS. 1 to 18. The ability to use the cable for this purpose is an advantage because as the linear speed of the vehicle 1 is slow, thereby making movement from one irrigating position to another time-consuming, automatic guidance would enable the operator to leave the vehicle unattended while it is moving to the new location.

Although the vehicle described is guided by the taut cable 16 and this may also be used to assist or to effect propulsion, guidance may be effected by using a pre-laid taut cable to which the steering arm 23 is responsive, instead of employing the cable 16 and the winch 20. The pre-laid taut guidance cable may be mounted on posts or similar fixed anchorages spaced apart in the field to be irrigated in a straight line or another configuration such as a triangle.

The irrigation apparatus described herein has the advantage over existing travelling hose-drum irrigation machines in that irrigation is effected continuously throughout the cycle, that is there no "dry" return run of the apparatus. There is also the advantage that the hose is not dragged over the ground. Instead it is unrolled onto the ground and then rewound onto the hose drum as the vehicle is moved. Thus the hose can be of lighter construction and therefore cheaper.

Yet another advantage is that a predetermined guidance path does not have to be provided for the vehicle 1. Instead the operator only has to provide a fixed hydrant 6 or other fixed source of water and the fixed anchorages 24, 30 and 31 although as already stated a prelaid taut guidance cable may be provided.

Although in the irrigation machine described with reference to the drawings, the hose drum is driven in both the unwinding and rewinding senses, the hose may be unwound in a controlled manner from the drum, without driving the drum, by the pull of the hose as the vehicle 1 is travelling away from an anchorage.

What I claim as my invention and desire to secure by Letters Patent of the United States is:

1. Irrigation apparatus comprising a vehicle movable between at least two predetermined fixed positions spaced apart in an area of ground to be irrigated; a hose drum mounted for rotation on the vehicle and having a hose wound thereon, the hose having an inlet end to be fixed with respect to a fixed source of water and an outlet end connected to a water-discharging device movable with the vehicle when the vehicle is moving between said spaced fixed positions; means whereby said hose is unwound from said drum when the vehicle is moving away from said fixed inlet end of said hose; means to rewind said hose on said drum when the vehicle is moving towards said fixed inlet end of said hose; means for propelling the vehicle between said fixed positions; guiding means for maintaining the vehicle in a substantially straight path during its travel between said fixed positions, said guiding means including a taut cable extending between said fixed positions and defining said straight path and steering means mounted on the vehicle and responsive to deviation of the vehicle to either side of said cable and operable to restore the vehicle to said straight path defined by said cable, said steering means comprising an arm pivotally mounted with respect to the vehicle for swinging transversely of the vehicle about an upright axis, said cable engaging said arm, whereby said arm will be swung transversely of the vehicle by the cable when the vehicle deviates sideways from the line of the cable, and means operable by the pivotal movement of said arm to impart a steering correction to the vehicle in response to said sideways deviation of the vehicle from the line of said cable, the apparatus also comprising a winch carried by the vehicle, said cable wound around said winch adjacent one end of said cable; means for driving said winch in the winding-in sense of said cable to maintain said cable taut, said cable also being arranged to be passed around at least one pulley and connectable at its end remote from said winch to an anchorage for said cable, each said pulley being attachable to a pulley anchorage at a respective one of said fixed positions, whereby the vehicle will be guided by said cable towards said respective fixed position or to a plurality of said respective fixed positions in sequence, each said fixed position to which the vehicle is guided being determined by a respective said pulley being attached to a respective one of said pulley anchorages, and means whereby each said pulley is releasable from said respective anchorage, after being engaged therewith, by engagement of said pulley with the vehicle, when the latter has reached said respective pulley anchorage and said arm having at least one socket therein in each of which each said pulley is locatable before it is engaged with a respective one of said pulley anchorages and after it is released therefrom.

2. Apparatus as claimed in claim 1 in which there is a latch lever pivotally mounted on said arm and liftable to open a respective socket therein to release or to receive said respective pulley when located in said socket.

3. Apparatus as claimed in claim 2 in which each said anchorage has a socket therein and spring catch means operable to hold a respective pulley engaged in said socket in said respective pulley anchorage, said catch means being releasable and said latch lever being openable as a result of the approach of said vehicle and thus said arm to the vicinity of said pulley anchorage, whereby said pulley will be transferred from said socket in said pulley anchorage to said socket in said arm and will be retained in said arm socket by the closing of said latch lever.

4. Apparatus as claimed in claim 1 in which said vehicle has a pair of steerable wheels and a reversible linkage interconnecting said arm and said pair of steerable wheels, whereby sideways pivoting of said arm effects steering of said steerable wheels.

5. Apparatus as claimed in claim 4 in which said linkage comprises valve means operable by said arm in either of two senses according to the direction of said sideways deviation; a fluid operable ram operable by said valve means to effect pivoting of said steerable wheels in the direction appropriate to correct said sideways deviation, and a further linkage movable by said steerable wheels to return said valve means to its normal means position when the correction of said sideways deviation has been effected.

6. Apparatus as claimed in claim 5 in which a further fluid control valve is connected in an additional control circuit operable to actuate said fluid operable ram to turn each of said steerable wheels to positions in which they rotate in a circular arc about a point in the fore-and-aft axis of the vehicle.

* * * * *

UNITED STATES PATENT AND TRADEMARK OFFICE
CERTIFICATE OF CORRECTION

PATENT NO. : 4,509,685

DATED : April 9, 1985

INVENTOR(S) : Vernon B. W. Harvey

It is certified that error appears in the above-identified patent and that said Letters Patent is hereby corrected as shown below:

Column 2, line 31 delete "swivellable" insert --rotatable--.

Column 2, line 33 delete "parcircular" --semi-circular--.

Column 3, line 2 delete "manoeuvering" insert --maneuvering--.

Column 3, line 5 delete "manoeuvering" insert --maneuvering--.

Column 3, line 56, delete "swivellable" insert --rotatable--.

Column 4, line 15 delete "manoeuvre" insert --maneuver--.

Column 4, line 44 delete "end" insert --ends--.

Column 6, line 12 delete "anti-clockwise" insert --counter-clockwise--.

Column 6, line 36 delete "manoeuvering" insert --maneuvering--.

Column 6, line 39 delete "manoeuvering" insert --maneuvering--.

Column 7, line 28 delete "anti-clockwise" insert --counter-clockwise--.

UNITED STATES PATENT AND TRADEMARK OFFICE
CERTIFICATE OF CORRECTION

PATENT NO.   : 4,509,685

DATED        : April 9, 1985

INVENTOR(S)  : Vernon B. W. Harvey

It is certified that error appears in the above-identified patent and that said Letters Patent is hereby corrected as shown below:

Column 8, line 40 delete "1 to 18" insert --1 or 18--.

Signed and Sealed this

Third Day of December 1985

[SEAL]

Attest:

DONALD J. QUIGG

Attesting Officer

Commissioner of Patents and Trademarks